Nov. 17, 1942.  J. NEUFELD  2,302,247
WELL SURVEYING METHOD AND APPARATUS
Filed April 22, 1940
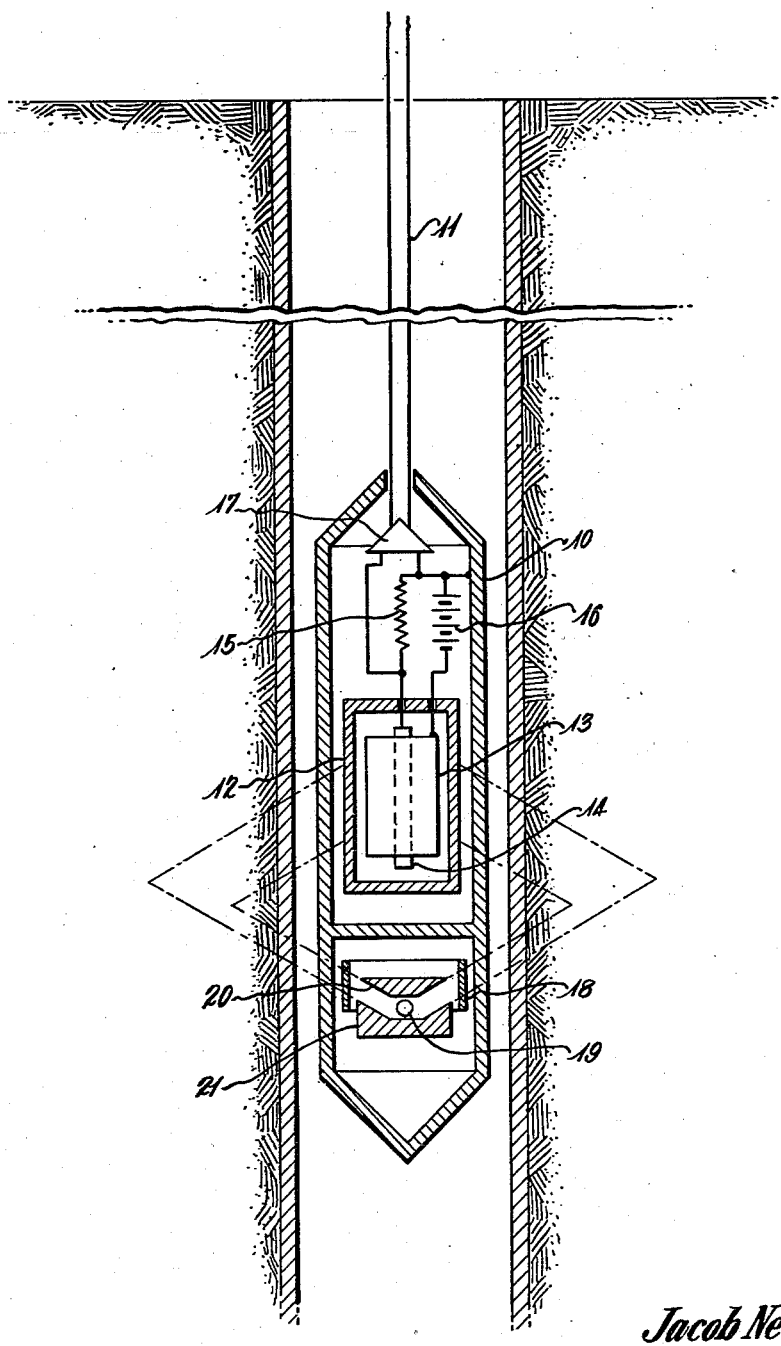
Inventor
Jacob Neufeld
By Stevens and Davis
Attorneys Patented Nov. 17, 1942

2,302,247

UNITED STATES PATENT OFFICE 2,302,247

WELL SURVEYING METHOD AND APPARATUS

Jacob Neufeld, Tulsa, Okla., assignor to Well Surveys, Incorporated, Tulsa, Okla., a corporation of Delaware Application April 22, 1940, Serial No. 331,038

7 Claims. (Cl. 250—83.6)

This invention relates to geophysical prospecting and more particularly to an improvement in that type of geophysical prospecting that comprises bombarding subsurface strata, in situ, with neutrons or similar deeply penetrating radiations and measuring the resultant scattered, reflected, induced or secondary radiations.

In application 239,781 filed November 10, 1938, by Robert E. Fearon a method is described of determining the nature of subsurface strata by bombarding the strata with neutrons or the like and measuring the gamma rays returned to a point nearby. Various improvements upon this method and further advances along the same general line are described in the following applications filed by the same inventor: Serial Nos. 325,880, March 25, 1940; 323,981, March 14, 1940; and 326,510, March 28, 1940. Patent No. 2,133,776 granted to John C. Bender on October 18, 1938 also discloses a method of this general type.

The present invention is an improvement that is applicable to any method of this type and the main purpose of this improvement is to avoid much of the heavy shielding that is necessary to prevent neutrons or the like from passing directly from the primary source to the detector and thus producing an error in the measurements. The invention also provides a way of controlling the neutron bombardment so that it is concentrated in a particular direction where it will be most effective for the purpose of causing radiations for the desired measurements.

If an attempt is made to accomplish this result by merely shielding a source of neutrons so that the neutrons can escape only in the desired direction much difficulty is encountered because neutrons are very penetrating and relatively great thicknesses of shielding are necessary to stop them effectively. Since the instruments in which these sources of neutrons are to be used are necessarily of relatively small dimensions so that they can be lowered into a bore hole the problem of providing sufficient shielding is unusually difficult.

It has now been discovered that this difficulty may be overcome by the use of a source of alpha radiations and a material that will generate neutrons upon being radiated with alpha radiations, if the source of alpha radiations is so arranged and shielded that the alpha radiations impinge on the neutron generating source only in the direction in which it is desired to have the generated neutrons travel.

According to an article by Madame Pierre Curie in Radioactivite, vol. II, Hermann & Cie. editors, Paris, 1935, page 376, if the alpha radiations are directed from a suitable source onto a material that will generate neutrons upon exposure to alpha radiations, most of the neutrons emitted will travel in the direction in which the alpha radiations are traveling when they strike the neutron emitting material.

It so happens that alpha radiations have very little penetrating power and hence a source of alpha radiations can be easily shielded. Now, if the source of alpha radiations is shielded so that the alpha radiations are allowed to fall on a neutron generating material such as beryllium or boron, only from a single direction, then the neutrons, for the most part, will be emitted in that direction.

Following these principles, a device may be made for lowering into a well, which device will contain a detector of returning radiations and a generator of primary radiations. The generator may consist of a material that will emit neutrons and a source of alpha radiations so arranged as to radiate this source of neutrons with alpha radiations traveling for the most part in such a direction that the resultant neutrons will be directed outwardly away from the detecting instrument at just the proper angle so that they will have no substantial effect on the detecting instrument themselves but will have a maximum effect in generating secondary radiations at the desired place or in being scattered and returning to the measuring instrument.

For a more complete understanding of the details and advantages of this invention reference may be had to the appended drawing in which the sole figure shows diagrammatically a simple form of measuring instrument constructed according to the principles of this invention.

As illustrated, a detecting instrument according to the principles of this invention may consist of a cylindrical housing 10 suspended from the surface by means of a cable 11, which also carries conductors for conveying a measurement indicating current to the surface. Within the cylindrical housing, which incidentally is sealed so that the fluids in the well bore cannot enter it, there may be positioned a detecting unit and a unit for generating primary radiations.

The detecting unit may consist of an ionization chamber 12 containing a pair of electrodes 13 and 14 and filled with an inert gas such as argon under a pressure of around 1500 to 2000 pounds per square inch. The electrodes are preferably a cylindrical iron rod and a surrounding cylindrical iron shell.

Connections from the electrodes are carried through the chamber wall in insulated bushings and a resistor 15 and a battery 16 are connected in series across the electrode terminals outside of the chamber. The resistor preferably has a resistance of around $10^{12}$ ohms and the battery a voltage of around 150 volts. The voltage developed across the resistor will be proportional to the current which flows in the circuit and is governed by the state of ionization of the gas in the ionization chamber which in turn is controlled by the radiations passing through it. Across the resistor 15 there is preferably connected an amplifier 17 which generates a current proportional to the voltage across the resistor and sends this voltage to the surface through the cable 11.

The recording equipment on the surface is of the same general nature as that described in the applications mentioned in the first part of this specification and hence has not been illustrated and will not be re-described here in detail. It consists of a means for raising and lowering the casing 10 in the well and for recording the currents from the amplifier 17 in correlation with determinations of the position of the casing at the time when the currents are generated. By continuous operation of the device a continuous log of the well may be directly made.

Also within the casing 10 and preferably located a short distance below the measuring instrument is a source of primary neutrons which in the present instance has been shown as a ring of beryllium containing material 18. A ring of boron containing material may be used instead or the material may be in the form of a block or plate rather than in the shape of a ring. Any other material that will generate neutrons upon being bombarded with alpha particles may also be used.

Within the ring and at a position such that its radiations will fall on the ring in a direction that is outward and somewhat upward from the source is a source of alpha particles 19. This source may be radon, mesothorium, radiothorium or any other material that will give off alpha particles in sufficient quantities to cause the desired production of neutrons. Above and below the source of alpha particle source there may be arranged shields 20 and 21 which prevent the alpha particles from traveling in directions in which they will not be useful.

By arranging the source of alpha particles so that the alpha particles travel upwardly and outwardly to the neutron generating material, the neutrons that are generated are also caused to travel outwardly and upwardly so that they penetrate out into the surrounding strata rather than upwardly toward the detecting instrument. At the same time they are caused to pass into the surrounding strata at a place where their action on the surrounding strata will have the greatest possible effect in causing radiations to return to the measuring instrument.

For the purpose of illustrating this fact dotted lines are shown in the drawing, indicating the path of the major portion of the emitted neutrons and the path of the returning radiations which effect the ionization chamber. It will readily be apparent from these dotted lines that the neutrons generated by the arrangement shown will be efficiently used to cause the greatest possible intensity of returning radiations to the measuring instrument and yet that very few of the neutrons generated will have any tendency to pass directly to the ionization chamber.

As has been already stated the device may be modified or changed in any one of the great number of ways without departing from the principles of this invention. Also it can be used either in cased or uncased wells. It is to be understood therefore that the scope of this invention is limited only within the scope of the accompanying claims.

I claim:

1. In a device for geophysical prospecting which includes a source of primary radioactive radiations and a detector for detecting radiations that result in the bombardment of formations under investigation with said primary radiations, the improvement that comprises as a source of said primary radioactive radiations a material that emits said primary radioactive radiations upon being bombarded with less penetrating radiations, a source of said less penetrating radiations and means to shield said source of less penetrating radiations so that said less penetrating radiation bombards said source of primary radiation substantially only in a predetermined direction.

2. In a method of geophysical prospecting in which formations to be investigated are bombarded by a source of primary radioactive radiation and radiations emerging from said formations as a result are measured, the improvement that comprises generating said primary radioactive radiations from a material capable of producing said primary radiations by bombarding said material with less penetrating radiations while directing said less penetrating radiations so that the primary radiations when generated are directed, for the most part, into the formation and not toward the detecting point.

3. In a method of geophysical prospecting in which formations to be investigated are bombarded with neutrons and the gamma rays emitted from the formations as a result thereof are measured, the improvement that comprises generating the neutrons by bombarding a material with alpha particles which material will generate neutrons upon such bombardment, and directing the bombarding alpha particles so that they strike the neutron emitting material in a direction that will cause the neutrons, which are emitted in the same direction to pass into the formation being studied rather than toward the point at which gamma rays are detected.

4. In a device for geophysical prospecting which includes a source of neutrons and a detector for detecting gamma rays emitted from the formations bombarded with said neutrons, the improvement that comprises utilizing as a means to generate said neutrons, a substance that will emit neutrons upon being bombarded by alpha particles and a source of alpha particles so placed in relation to said neutron emitting substance that the alpha particles will strike the neutron emitting substance in a direction such as to drive the neutrons into the formation under investigation rather than towards the point at which the returning gamma rays are detected.

5. In a device for geophysical prospecting which includes a casing adapted to be lowered into a well bore and containing a source of neutrons and an instrument for detecting gamma rays which return from the surrounding formations as a result of their being bombarded with the neutrons, the improvement comprises as a means to generate neutrons a material that will generate neutrons upon being bombarded with alpha particles and a source of alpha particles so arranged with respect to the neutron generating material that the alpha particles strike the neutron generating material, for the most part, while traveling generally toward the formations surrounding the measuring part of the instrument so that the neutrons will be emitted in that same general direction instead of toward the measuring instrument.

6. In a geophysical prospecting device, a directional primary radiation source that comprises a mass of material capable of emitting a first type of radiation when subjected to a second type of radiation and a directional source of said second type of radiation disposed to transmit its radiation in the direction of the intended path of said first type of radiation.

7. In a geophysical prospecting device of the type that includes a source of a first type of radiation for bombarding geological formations under investigation and a detector for radiation emanating from the formations, the improvement that comprises a mass of material capable of emitting said first type of radiation when subjected to bombardment with a second type of radiation and a directional source of said second type of radiation disposed to transmit its radiation in the direction of the intended path of said first type radiation.

JACOB NEUFELD.